(12) United States Patent
Ito (10) Patent No.: US 6,392,362 B1
(45) Date of Patent: May 21, 2002

(54) DISCHARGE LAMP LIGHTING CIRCUIT

(75) Inventor: Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/592,621

(22) Filed: Jun. 13, 2000

(30) Foreign Application Priority Data

Jun. 21, 1999 (JP) .......................................... 11-174374

(51) Int. Cl.[7] .............................................. H05B 37/02
(52) U.S. Cl. .................... 315/224; 315/307; 315/DIG. 4
(58) Field of Search ................................ 315/224, 307, 315/DIG. 4, 209 R (56) References Cited

U.S. PATENT DOCUMENTS

| | | |
|---|---|---|
| 5,019,959 A | 5/1991 | MacDonald et al. |
| 5,212,428 A | 5/1993 | Sasaki et al. |
| 5,705,898 A | 1/1998 | Yamashita et al. |
| 6,239,558 B1 * | 5/2001 | Fujimura et al. ........... 315/307 |

FOREIGN PATENT DOCUMENTS

| | | |
|---|---|---|
| GB | 2 030 388 A | 4/1980 |
| JP | 4-141988 | 5/1992 |
| WO | WO 89/08880 | 9/1989 |

* cited by examiner

Primary Examiner—David Vu
(74) Attorney, Agent, or Firm—Fish & Richardson P.C.

(57) ABSTRACT

In a discharge lamp lighting circuit, positive-polarity voltage and negative-polarity voltage output separately from two output terminals of a DC power supply circuit 3 are sent to a DC-AC conversion circuit 4. A pair of switch elements sw1 and sw2 is provided in the DC-AC conversion circuit 4 to switch the output voltages of the DC power supply circuit 3 and the switch elements sw1 and sw2 are alternately operated by a drive circuit DRV. AC voltage generated as the switch elements sw1 and sw2 are alternately operated is supplied to a discharge lamp 6. The number of parts can be decreased by adopting the half-bridge configuration using a pair of switch elements and the drive circuit of the switch elements for one discharge lamp.

13 Claims, 10 Drawing Sheets

DISCHARGE LAMP LIGHTING CIRCUIT

BACKGROUND OF THE INVENTION

This invention relates to a discharge lamp lighting circuit which reduces the number of parts and costs by improving the configuration of a DC power supply circuit and a DC-AC conversion circuit making up the parts of a discharge lamp lighting circuit.

The configuration of a lighting circuit of a discharge lamp, such as a metal halide lamp, comprising a DC power supply circuit, a DC-AC conversion circuit, and a starter circuit is known.

For example, in the circuit configuration wherein a DC-DC converter is used as a DC power supply circuit and a full-bridge circuit comprising two pairs of semiconductor switching elements for performing switching control and a driver circuit thereof are used for a DC-AC conversion circuit, the positive-polarity voltage (positive voltage) output by the DC-DC converter is converted into rectangular-wave voltage in the full-bridge type circuit, then this voltage is supplied to a discharge lamp. That is, when positive voltage is supplied to one terminal of the discharge lamp, the potential of the other terminal becomes a ground level; and when the potential of the one terminal drops to the ground level, positive voltage is supplied to the other terminal. This cycle is repeated.

However, the lighting circuit requires the four switching elements and the two half-bridge drivers for driving the switching elements as the components of the full-bridge type circuit, causing an increase in the number of parts and a rise in costs; this is a problem.

For example, to use a discharge lamp as a light source of a car's front light, if a front light is mounted to each of the left and the right of the front of the vehicle, two left and right discharge lamps and their respective lighting circuits become necessary. To adopt a configuration wherein high and low beams are provided by separate discharge lamps (so-called four-light illumination), two left and two right discharge lamps and their respective lighting circuits are required. In such a case, eight switch elements and four half-bridge drivers in all are required for the two discharge lamps, thus costs are increased and in addition, as a unit is upsized, it becomes difficult to provide a circuit unit placement space.

SUMMARY OF THE INVENTION

It is therefore an object of the invention to simplify a DC-AC conversion circuit forming a part of a discharge lamp lighting circuit, thereby reducing costs and miniaturize a unit.

To the end, according to the invention, there is provided a discharge lamp lighting circuit comprising a DC power supply circuit for receiving DC input voltage and outputting any desired DC voltage and a DC-AC conversion circuit being placed at a stage following the DC power supply circuit for converting the output voltage thereof into AC voltage and then supplying the AC voltage to a discharge lamp, in that positive-polarity voltage and negative-polarity voltage output separately from two output terminals of the DC power supply circuit are sent to the DC-AC conversion circuit, that a pair of switch elements provided in the DC-AC conversion circuit to switch the output voltages of the DC power supply circuit is alternately operated by a drive circuit of the switch elements, and that AC voltage generated as the switch elements are alternately operated is supplied to the discharge lamp.

According to the invention, a pair of switch elements is provided in the DC-AC conversion circuit for one discharge lamp and drive control may be performed so as to alternately operating the switch elements, so that the circuit configuration is simplified. Namely, two switch elements and one half bridge driver need only be provided per discharge lamp.

DETAILED DESCRIPTION OF THE PREFERRED EMBODIMENTS

Figure 1:
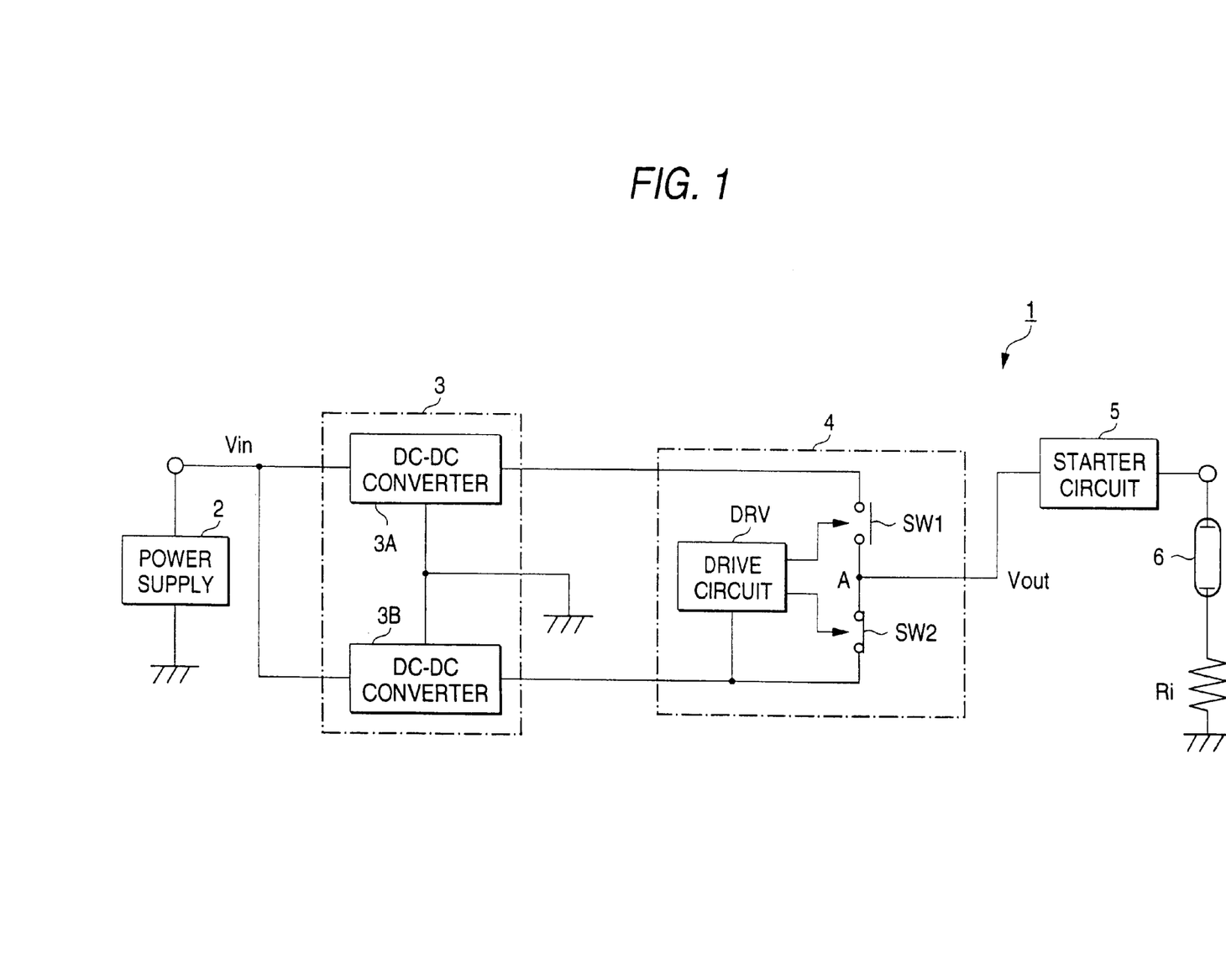
FIG. 1 is a circuit block diagram to show the basic configuration of a discharge lamp lighting circuit according to the invention.

FIG. 1 shows the basic configuration of a discharge lamp lighting circuit according to the invention; it shows the circuit configuration concerning one discharge lamp (only a feed system except a control system).

A discharge lamp lighting circuit 1 comprises a power supply 1, a DC power supply circuit 3, a DC-AC conversion circuit 4, and a starter circuit 5.

The DC power supply circuit 3 receives DC input voltage (Vin) from the power supply 2 and outputs any desired DC voltage. The output voltage is variable-controlled in response to a control signal from a control circuit (not shown)). The DC power supply circuit 3 uses DC-DC converters each having the configuration of a switching regulator (chopper type, flyback type, etc.,); a first circuit part (DC-DC converter 3A) for providing positive-polarity voltage output (positive voltage output) and a second circuit part (DC-DC converter 3B) for providing negative-polarity voltage output (negative voltage output) are placed in parallel with each other.

Figure 2:
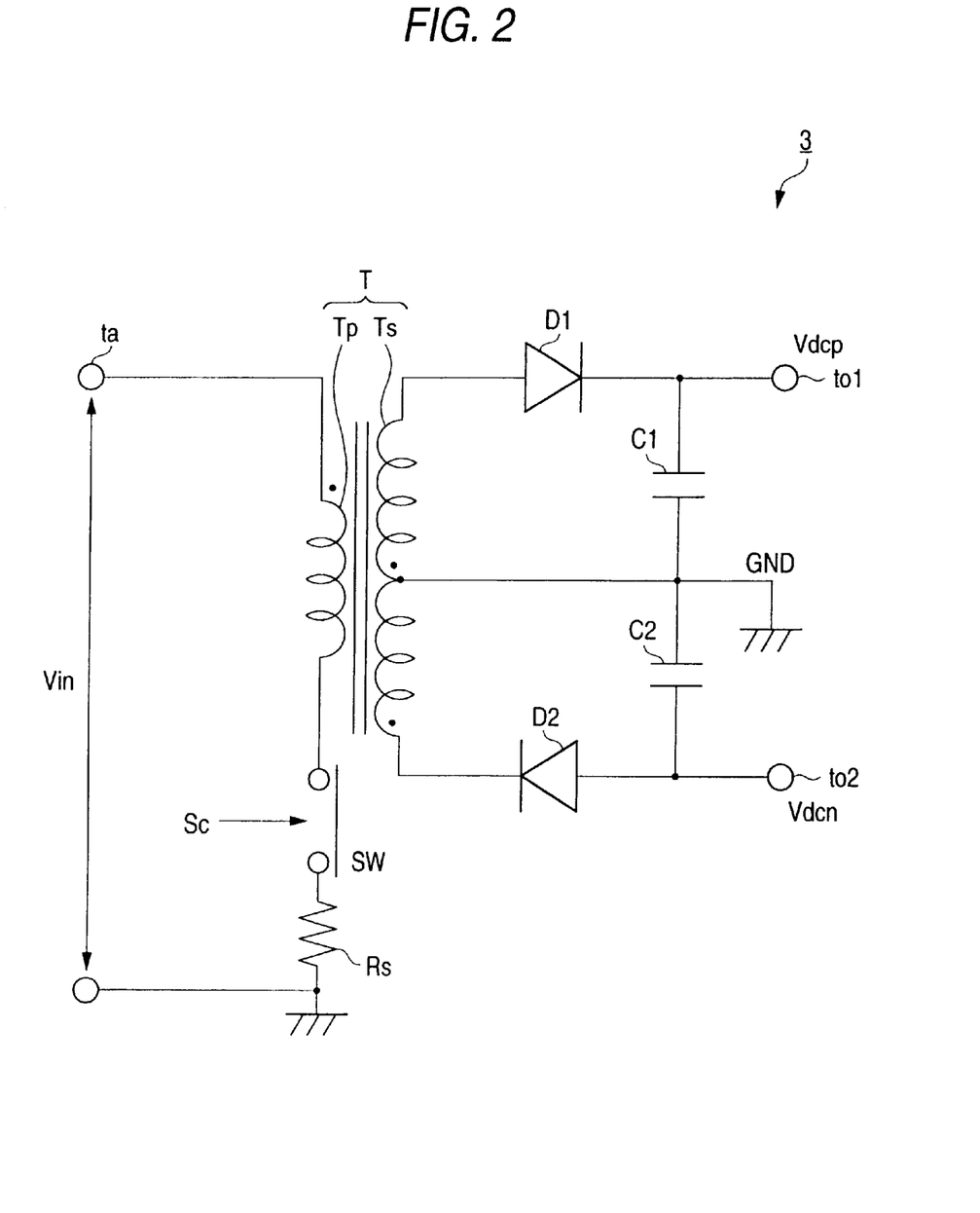
FIG. 2 is a circuit diagram to show a configuration example of a DC power supply circuit.

FIG. 2 shows a configuration example of the DC power supply circuit 3.

A primary winding Tp of a transformer T is connected at one end to a DC input terminal ta, whereby the voltage Vin is input. The primary winding Tp is grounded at an opposite end via a semiconductor switch element SW (simply indicated by a switch symbol in the figure; a field-effect transistor, etc., is used) and a current detection resistor Rs, which is arbitrary and need not necessarily be provided. A signal Sc from the control circuit (not shown) is supplied to a control terminal of the semiconductor switch element SW (a gate terminal if the switch element SW is an FET) for performing switching control of the semiconductor switch element SW.

A secondary winding Ts of the transformer T is connected at one end to an anode of a diode D1 and a cathode of the diode D1 is grounded via a capacitor C1. Terminal voltage of the capacitor C1 becomes output voltage (Vdcp) via a terminal to1. The secondary winding Ts is connected at an opposite end to a cathode of a diode D2 and an anode of the diode D2 is grounded via a capacitor C2 and is connected to a terminal to2. Output voltage (Vdcn) is provided through the terminal to2.

An intermediate tap at middle of the secondary winding Ts is grounded.

Thus, the DC power supply circuit 3 outputs the positive-polarity voltage Vdcp (>0) and the negative-polarity voltage Vdcn (<0) separately from the two output terminals.

The "." mark added to each winding of the transformer T denotes the winding start; for example, the "." mark is added to each of the connection end to the diode D2 and the winding start end at an intermediate tap grounded.

The DC-AC conversion circuit 4 is placed at the stage following the DC power supply circuit 3 for converting the output voltage of the DC power supply circuit 3 into AC voltage and then supplying the AC voltage to a discharge lamp 6. The positive-polarity voltage and the negative-polarity voltage are sent separately from the two output terminals of the DC power supply circuit 3 to the DC-AC conversion circuit 4. To switch the output voltage Vdcp of the DC-DC converter 3A and the output voltage Vdcn of the DC-DC converter 3B, a pair of semiconductor switch elements sw1 and sw2 (simply indicated by switch symbols in the figure although field-effect transistors, etc., are used as the switch elements) provided in the DC-AC conversion circuit 4 is operated alternately by a drive circuit DRV, and the generated AC voltage is supplied to the discharge lamp 6.

That is, one of the two switch elements sw1 and sw2 connected in series at the output stage of the DC power supply circuit 3, element sw1, is connected to the output terminal of the DC-DC converter 3A and also to the output terminal of the DC-DC converter 3B via element sw2. For example, an IC (integrated circuit) known as a half-bridge driver is used as the drive circuit DRV for performing switching control of the switch elements reciprocally. That is, the half bridge alternating operation is performed so that when the element sw1 is on, the element sw2 is turned off and that when the element sw1 is off, the element sw2 is turned on based on signals supplied to the control terminals of the switch elements from the drive circuit DRV, whereby the DC voltage is converted into AC voltage.

The starter circuit 5 is provided for generating a start signal (high voltage pulse) at the beginning of lighting the discharge lamp 6 for starting the discharge lamp 6. The start signal is superposed on AC voltage Vout output by the DC-AC conversion circuit 4 and is applied to the discharge lamp 6. That is, the starter circuit 5 contains an inductive load (inductance component) and the discharge lamp 6 is connected at one electrode terminal to a connection point A of the switch elements sw1 and sw2 via the inductive load and at the other electrode terminal to ground (GND) directly or via current detection means (current detection resistor, coil, etc.), whereby it is grounded.

Figure 3A:
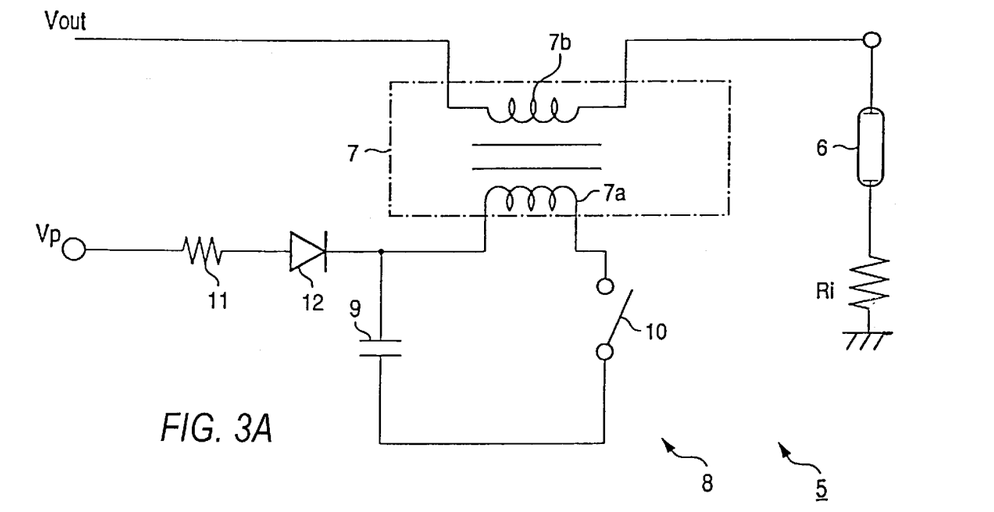
FIG. 3A is a circuit diagram to show a configuration example of a starter circuit.

FIG. 3A shows a configuration example to the starter circuit 5.

A transformer 7 in the starter circuit 5 comprises a secondary winding 7b relative to a primary winding 7a and the secondary winding 7b is connected at one end to the above-mentioned connection point A and at an opposite end to the discharge lamp 6. This means that the secondary winding 7b corresponds to the above-mentioned inductive load.

A primary circuit 8 containing the primary winding 7a comprises a capacitor 9 and a switch element 10 (simply indicated by a switch symbol in the figure; a discharge gap element, a thyristor, a triac, etc., is used). When the switch element 10 conducts (or breaks down), the capacitor 9 is charged and the generated voltage at this time is increased by the transformer 7, then is applied to the discharge lamp 6 through the secondary winding 7b. For example, primary voltage Vp is supplied to the capacitor CS via a resistor 11 and a forward diode 12, whereby the capacitor 9 is charged and when the terminal voltage of the capacitor 9 reaches a predetermined threshold voltage, the switch element 10 actuates and the capacitor 9 is discharged, so that voltage is generated on the primary winding 7a.

For example, the following supply methods of the primary voltage Vp are available, any of which may be used:

(I) the primary voltage is provided from output voltage of the DC power supply circuit or the DC-AC conversion circuit;

(II) the primary voltage is provided by increasing output voltage of the DC power supply circuit or the DC-AC conversion circuit through a voltage doubler circuit, etc.;

(III) the primary voltage of the transformer in the starter circuit is provided by adding a winding to the secondary side of a converter transformer placed in the DC power supply circuit and rectifying and smoothing output of the secondary winding.

According to the circuit configuration, the half-bridge configuration using a pair of switch elements and their drive circuit is only required for one discharge lamp.

As shown in FIG. 1, the drive circuit DRV is operated based on the negative-polarity voltage of the voltage Vdcn. Therefore, power supply voltage Vccbr for the drive circuit DRV becomes necessary. Similar consideration is also required for a control signal (clock signal) input to the drive circuit DRV.

Figure 3B:
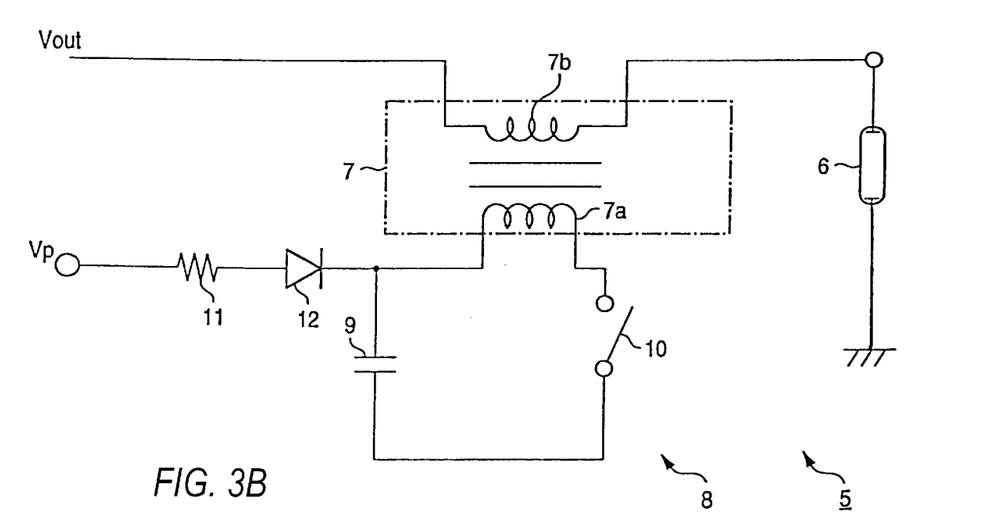
FIG. 3B is a circuit diagram of an embodiment of a starter circuit.

FIG. 3B shows an embodiment of the starter circuit 5 showing one end of the discharge lamp 6 connected directly to ground and another end connected to the secondary winding 7b of the transformer 7.

Figure 4:
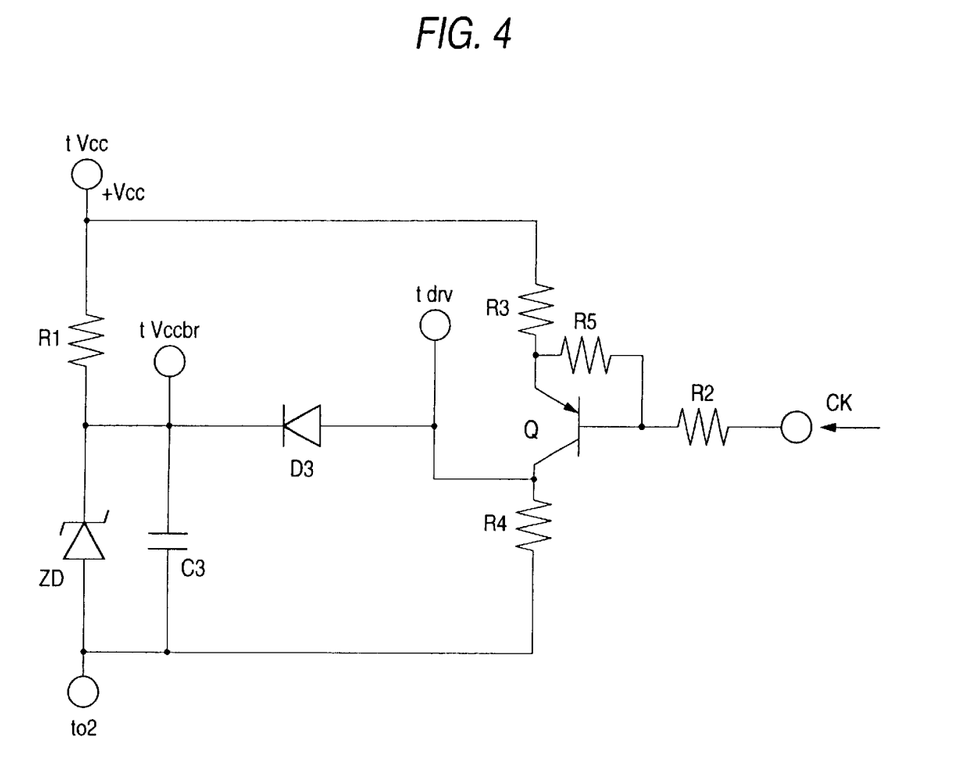
FIG. 4 is a circuit diagram to describe power supply voltage and signal supplied to a drive circuit DRV.

FIG. 4 shows a circuit configuration example for the purpose.

The output terminal to2 of the DC-DC converter 3B is connected to an anode of a Zener diode ZD and a cathode of the Zener diode ZD is connected via a resistor R1 to a power supply terminal tVcc of +Vcc. The symbol +Vcc denotes a predetermined power supply voltage provided by a power supply voltage generation circuit (not shown).

A capacitor C3 placed in parallel with the Zener diode is connected at one end between the resistor R1 and the Zener diode and to the power supply voltage terminal Vccbr of the drive circuit DRV.

A signal CK is a square wave signal for defining the bridge polarity described above (the low CK signal level is defined as the ground level) and is supplied via a resistor R2 to the base of a pnp transistor Q. The transistor Q has an emitter connected via a resistor R3 to the power supply terminal tVcc and a collector via a resistor R4 to the terminal to2. As the collector is connected to a terminal tdrv, collector output is sent through the terminal tdrv to the drive circuit DRV. A diode D3 has an anode connected to the collector of the transistor Q and a cathode connected to the terminal tVccbr. A resistor R5 is a resistor inserted between the base and the emitter of the transistor Q.

In the circuit, for example, when the signal CK is low, the transistor Q is turned on and the voltage determined by the Zener diode ZD is supplied from the terminal tdrv to the drive circuit DRV; when the signal CK is high, the transistor Q is turned off and negative voltage is supplied from the terminal tdrv to the drive circuit DRV.

By the way, as shown in FIGS. 1 and 3A–3B, assuming that a shunt resistor (Ri) is inserted between one electrode terminal of the discharge lamp 6 and ground as current detection means for detecting a current flowing into the discharge lamp, the current of the discharge lamp can be detected by detecting a voltage drop occurring in the resistor. However, the direction of the detection signal at the time becomes a problem. That is, since the direction of the current flowing into the discharge lamp alternates in response to the polarity of the square wave, the detection signal becomes a positive value or a negative value; for example, assuming that the detection signal value of a current flowing when the positive-polarity voltage of square wave is supplied to the discharge lamp is a positive value, the detection signal value of a current flowing when the negative-polarity voltage of square wave is supplied to the discharge lamp because of polarity inversion is a negative value.

Such polarity (or sign) change of the detection signal in time (inversion) is cumbersome to handle for the control circuit using the detection signal and thus is not preferred. Then, to fix the polarity of the detection signal, for example, a circuit configuration wherein a non-inverting amplification circuit and an inverting amplification circuit are placed in parallel for a voltage drop caused by the current detection resister Ri and the output voltage of the non-inverting amplification circuit of the inverting amplification circuit is selectively output as shown in FIG. 5 can be adopted.

Figure 5:
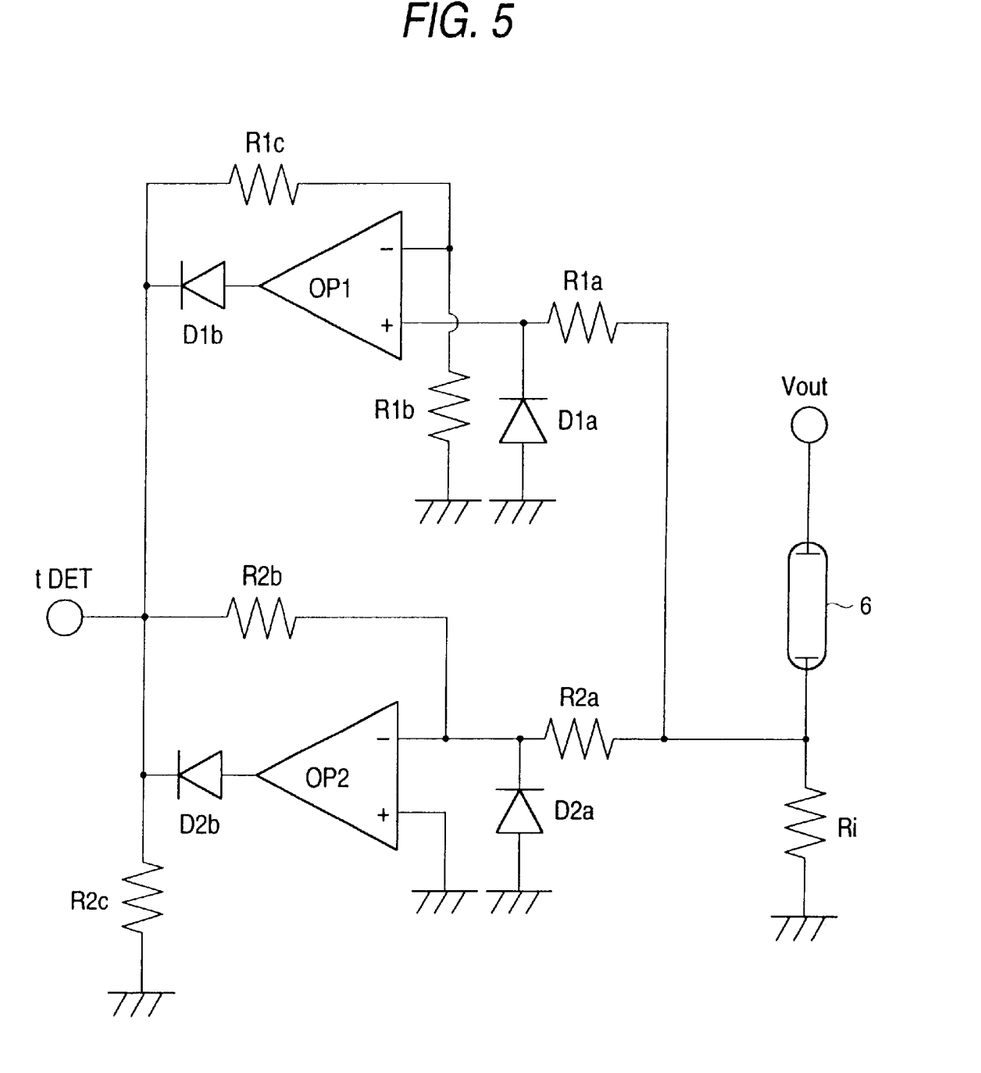
FIG. 5 is a drawing to show a circuit configuration example for fixing the polarity of a current detection signal related to a discharge lamp.

In FIG. 5, an operational amplifier OP1 provides a non-inverting amplification circuit and a non-inverting input terminal of the operational amplifier OP1 is connected between the discharge lamp 6 and the current detection resistor Ri via a resistor R1a. A diode D1a has a cathode connected to the non-inverting input terminal of the operational amplifier OP1 and an anode grounded. The diode D1a and a diode D2a (described later) are added for the purpose of protecting the operational amplifier when the input voltage to the operational amplifier is inverted to a negative value.

An output terminal of the operational amplifier OP1 is connected to an anode of a diode D1b and a cathode of the diode D1b is connected to a current detection terminal tDET. The non-inverting input terminal of the operational amplifier OP1 is grounded via a resistor R1a and is connected to the cathode of the diode D1b via a resistor R1c. The resistance values of the resistors R1a, R1b, and R1c are set to the same value.

An operational amplifier OP2 provides an inverting amplification circuit and an inverting input terminal of the operational amplifier OP2 is connected between the discharge lamp 6 and the current detection resistor Ri via a resistor R2a. A diode D2a has a cathode connected to the inverting input terminal of the operational amplifier OP2 and an anode grounded.

An output terminal of the operational amplifier OP2 is connected to an anode of a diode D2b and a cathode of the diode D2b is connected to the current detection terminal tDET and is grounded via a resistor R2c. The inverting input terminal of the operational amplifier OP2 is connected to the cathode of the diode D2b via a resistor R2b (the resistance value of the resistor R2b is set to twice that of the resistor R2a). A non-inverting input terminal of the operational amplifier OP2 is grounded.

In the circuit, the voltage drop caused by the current detection resistor Ri is amplified to twice voltage by the non-inverting amplification circuit of the operational amplifier OP1; on the other hand, it is amplified to "–2" X voltage by the inverting amplification circuit of the operational amplifier OP2. The voltage, whichever is higher, is selected by the diodes D1b and D2b placed at the output terminals of the operational amplifiers, and is output to the current detection terminal tDET. That is, when positive-polarity voltage is supplied to the discharge lamp 6, the output voltage of the non-inverting amplification circuit of the operational amplifier OP1 is provided at the current detection terminal tDET and when negative-polarity voltage is supplied to the discharge lamp 6, the output voltage of the inverting amplification circuit of the operational amplifier OP2 is provided at the current detection terminal tDET. The detection voltage thus provided can be used as a signal to determine whether or not the discharge lamp is lighted, a signal to determine the light state of the discharge lamp and stipulate supply power.

In the description given above, the method of detecting the current of the discharge lamp by the current detection means connected to the discharge lamp is shown; a method of acquiring a current detection signal or a voltage detection signal at the stage following the DC power supply circuit is available.

Figure 6:
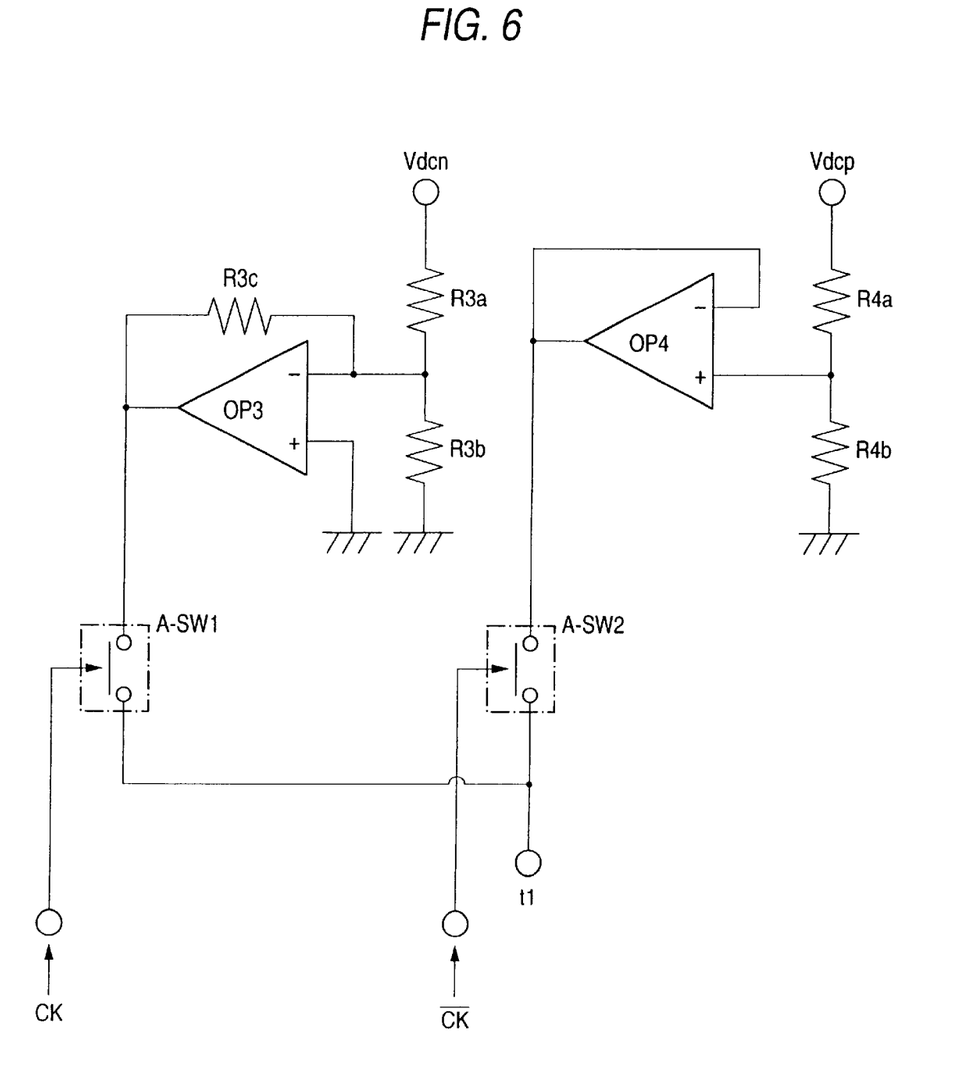
FIG. 6 is a drawing to show a circuit configuration example for detecting voltage at the stage immediately following the DC power supply circuit.

FIG. 6 shows an example of the circuit configuration for detecting output voltage at the stage immediately following the DC power supply circuit.

In the figure, the output voltage Vdcn of the DC-DC converter 3B is divided by means of resistors R3a and R3b, then supplied to an inverting input terminal of an operational amplifier OP3. The operational amplifier OP3 has an output terminal connected via a resistor R3c to the inverting input terminal as inverting amplification and a non-inverting input terminal grounded.

Output voltage of the operational amplifier OP3 is taken out to a voltage detection terminal t1 through an analog switch A-SW1 (simply indicated by a switch symbol in the figure) using an FET, etc. A control signal to the analog switch A-SW1 is the above-mentioned signal CK.

On the other hand, the output voltage Vdcp of the DC-DC converter 3A is divided by means of resistors R4a and R4b, then supplied to a non-inverting input terminal of an operational amplifier OP4 implementing a voltage buffer. Output voltage of the operational amplifier OP4 is taken out to the voltage detection terminal t1 through an analog switch A-SW2 (simply indicated by a switch symbol in the figure). A control signal to the analog switch A-SW2 is an inversion signal of the above-mentioned signal CK (in the figure, CK is overscored with a bar).

In the circuit, for example, assuming that when the signal CK is high, the switch element sw2 is turned on and the switch element sw1 is turned off for supplying negative-polarity voltage to the discharge lamp 6, the analog switch A-SW2 is turned off and the analog switch A-SW1 is turned on. Thus, output voltage inverted and amplified by the operational amplifier OP3 relative to Vdcn is taken out as positive voltage from the voltage detection terminal t1. When the signal CK is low, the analog switch A-SW2 is turned on and the analog switch A-SW1 is turned off, thus the voltage division value of Vdcp is taken out as output voltage (positive voltage) from the voltage detection terminal t1. The voltage detection signal can be used as a signal for defining supply power to the discharge lamp, a signal for restricting the upper limit of the output voltage of the DC power supply circuit.

Next, the circuit configuration for modifying the lighting circuit to circuitry for lighting two discharge lamps 61 and 62 will be discussed with reference to FIG. 7.

In the lighting circuit 1 shown in FIG. 1, a pair of switch elements sw1 and sw2 and one drive circuit DRV are required for one discharge lamp; in a lighting circuit 1A for the two discharge lamps 61 and 62, double components, namely, two pairs of switch elements and two drive circuits are required.

Figure 7:
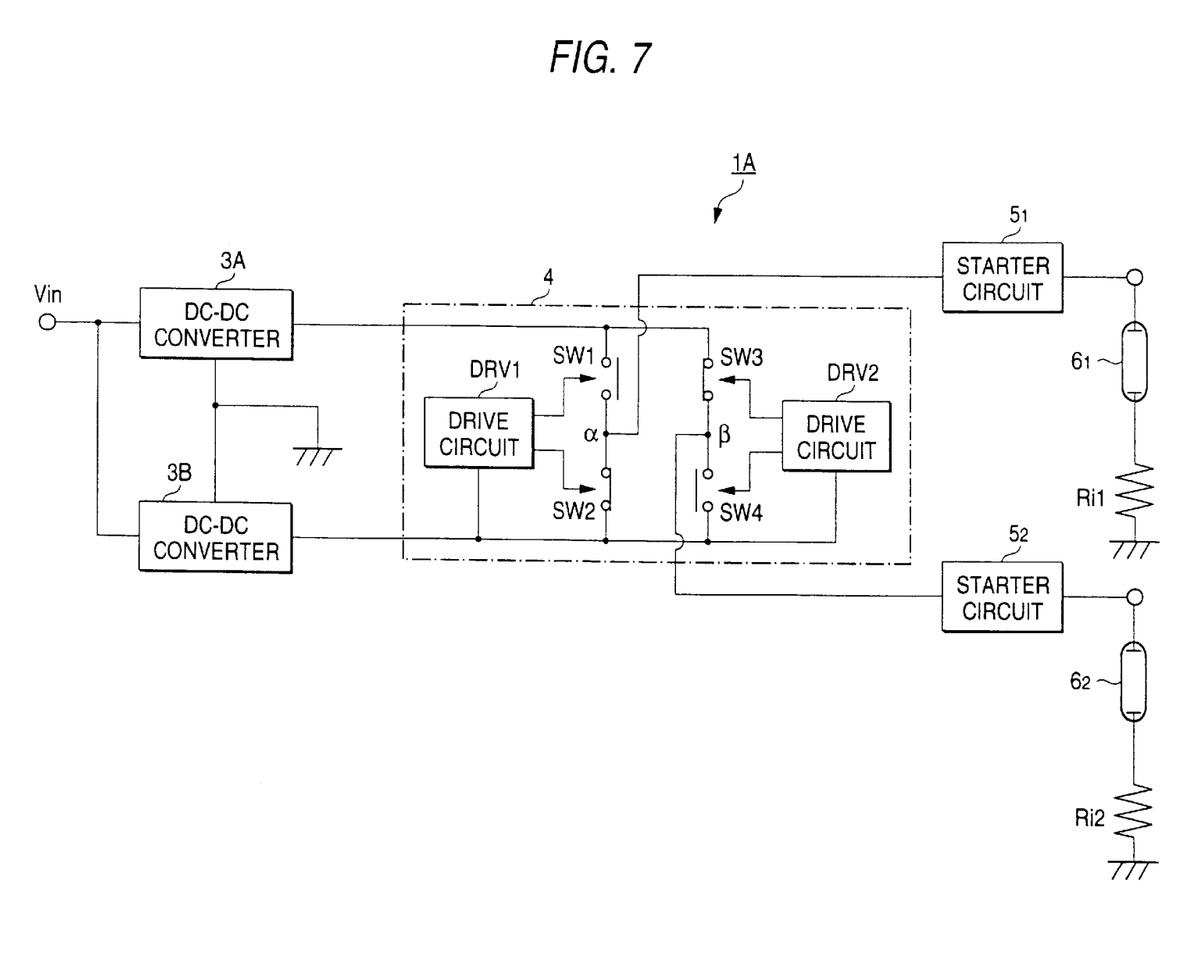
FIG. 7 is a drawing to show a configuration example for lighting two discharge lamps.

In this case, the two DC-DC converters 3A and 3B making up the DC power supply circuit 3 are shared between the two discharge lamps and the DC-AC conversion circuit 4 placed at the stage following the DC-DC converters 3A and 3B has a full-bridge type circuit configuration comprising four switch elements sw1, sw2, sw3, and sw4 (simply indicated by switch symbols in FIG. 7).

That is, one of the switch elements sw1 and sw2 connected in series as a first pair, sw1, is connected at one end to the output terminal of the DC-DC converter 3A and at an opposite end to the output terminal of the DC-DC converter 3B via the switch element sw2. The first discharge lamp 61 is connected to a connection point a of the switch elements sw1 and sw2 via (an inductive load of) a starter circuit 51.

One of the switch elements sw3 and sw4 connected in series as a second pair, sw3, is connected at one end to the output terminal of the DC-DC converter 3A and at an opposite end to the output terminal of the DC-DC converter 3B via the switch element sw4. The second discharge lamp 62 is connected to a connection point β of the switch elements sw3 and sw4 via (an inductive load of) a starter circuit 52.

At the stage following the DC-AC conversion circuit 4, the terminals of the first and second discharge lamps 61 and 62 not connected to the connection point α or β are connected to ground directly or via current detection means (in the figure, current detection resistors Ri1 and Ri2).

A half-bridge driver IC is used as each of drive circuits DRV1 and DRV2. The one drive circuit DRV1 controls turning on/off the switch elements sw1 and sw2 and the other drive circuit DRV2 controls turning on/off the switch elements sw3 and sw4. That is, assuming that the state of each switch element is defined so that the switch element sw1 is turned on and the switch element sw2 is turned off by the drive circuit DRV1 at one time, the state of each switch element is defined so that the switch element sw3 is turned off and the switch element sw4 is turned on by the drive circuit DRV2 at this time. Assuming that the state of each switch element is defined so that the switch element sw1 is turned off and the switch element sw2 is turned on by the drive circuit DRV1 at another time, the state of each switch element is defined so that the switch element sw3 is turned on and the switch element sw4 is turned off by the drive circuit DRV2 at this time. Thus, the switch elements sw1 and sw4 become the same state and the switch elements sw2 and sw3 become the same state; they alternately operate reciprocally.

Therefore, the two pairs of the switch elements are turned on and off, whereby while positive-polarity voltage is supplied to the first discharge lamp 61, for example, negative-polarity voltage is supplied to the second discharge lamp 62; conversely, while negative-polarity voltage is supplied to the first discharge lamp 61, positive-polarity voltage is supplied to the second discharge lamp 62.

To supply power supply voltage to the drive circuits DRV1 and DRV2, the method previously described with reference to FIG. 4 may be used, and the control signals to be sent to the drive circuits DRV1 and DRV2, for example, the above-described signal CK and the inversion signal thereof may be supplied to the drive circuits DRV1 and DRV2 respectively, of course.

To reduce the number of parts and costs, preferably the above-mentioned starter circuits $5_1$ and $5_2$, which are provided as separate circuits, are made a common circuit between the two discharge lamps $6_1$ and $6_2$.

Figure 8:
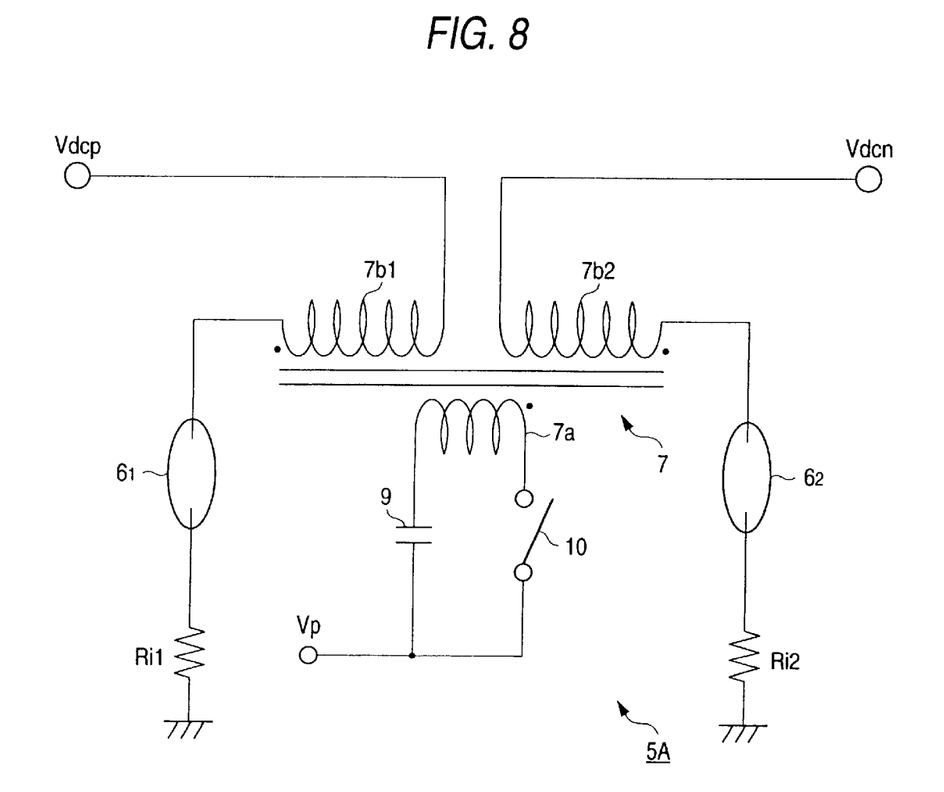
FIG. 8 is a circuit diagram to show a configuration example of a starter circuit made common between two discharge lamps.

FIG. 8 shows such a starter circuit configuration example $5_A$.

A transformer 7 in the starter circuit $5_A$ comprises two secondary windings 7b1 and 7b2 relative to one primary winding 7a, and the secondary windings 7b1 and 7b2 are connected to the discharge lamps $6_1$ and $6_2$ respectively.

A primary circuit 8 of the transformer 7 containing the primary winding 7a is provided with a capacitor 9 and a switch element 10. When the switch element 10 conducts (or breaks down), the capacitor 9 is discharged. The generated voltage at this time is increased by the transformer 7, then applied to the discharge lamps $6_1$ and $6_2$ via the secondary windings 7b1 and 7b2.

Preferably, the winding beginnings (or winding terminations) of the secondary windings 7b1 and 7b2 of the transformer 7 are defined as the connection terminal sides to the discharge lamps, whereby the connection relationship is unified (in the figure, the winding beginning is indicated by the "." mark). Although the reason is omitted, the polarities of the start signals to the discharge lamps are unified, whereby the withstand voltage design of the transformer is made advantageous and the supply directions of primary energy are unified, whereby the effect of the electromagnetic coupling between the secondary windings when striking potential again occurs is decreased and the discharge lamp is prevented from easily going out at the polarity switching time after the discharge lamp is lighted.

To light both the discharge lamps 61 and 62 at the same time from the state in which the discharge lamps are out, similar start (pulse) signals are applied to the discharge lamps, so that the discharge lamps can be started at the same time (or almost the same time). If one discharge lamp 61 is lighted without a problem and lighting the other discharge lamp 62 ends in failure, again the start signal is generated for starting the latter discharge lamp 62, whereby the discharge lamp can be lighted. At the time, the start signal is also applied to the lighted discharge lamp 61. However, since the impedance of the discharge lamp at the lighting time is low, the generated voltage is attenuated immediately and thus has no effect. On the other hand, the voltage generated on the secondary winding 7b2 connected to the discharge lamp 62 not lighted is a high-frequency voltage, so that the planned start signal is applied to the discharge lamp 62 with little receiving the effect of voltage attenuation on the secondary winding 7b1 connected to the discharge lamp 61.

Figure 9:
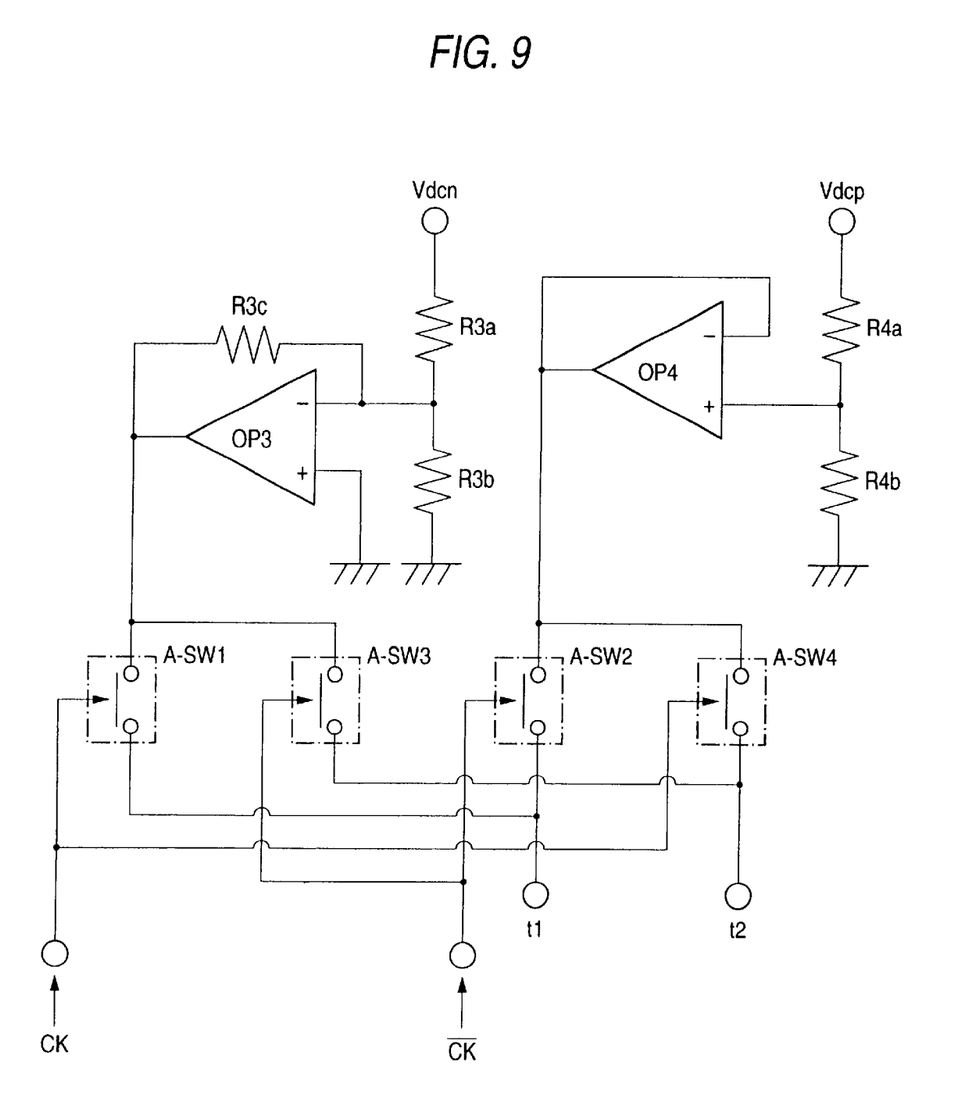
FIG. 9 is a drawing to show the configuration to apply the circuit configuration in FIG. 6 to lighting circuit for two discharge lamps.

To extend the voltage detection circuit shown in FIG. 6 to light the two discharge lamps 61 and 62, the number of the operational amplifiers OP3 and OP4 need not be doubled; two analog switches A-SW3 and A-SW4 need only to be added as shown in FIG. 9.

That is, the required configuration is as follows: Two analog switches A-SW1 and A-SW3 are provided for the output voltage of the operational amplifier OP3. When one analog switch A-SW1 is turned on by the signal CK, the output voltage is taken out to the voltage detection terminal t1 for the discharge lamp 61. When the other analog switch A-SW3 is turned on by the inversion signal of the signal CK, the output voltage is taken out to the voltage detection terminal t2 for the discharge lamp 62. Two analog switches A-SW2 and A-SW4 are provided for the output voltage of the operational amplifier OP4. When one analog switch A-SW2 is turned on by the inversion signal of the signal CK, the output voltage is taken out to the voltage detection terminal t1 for the discharge lamp 61. When the other analog switch A-SW4 is turned on by the signal CK, the output voltage is taken out to the voltage detection terminal t2 for the discharge lamp 62.

The reason why the voltage detection terminals can be thus separated for each discharge lamp is that while positive-polarity voltage is supplied to one discharge lamp, negative-polarity voltage is supplied to the other discharge lamp. For example, in FIG. 9, assuming that when the signal CK is low, the switch element sw1 is turned on and the switch element sw2 is turned off for supplying positive-polarity voltage to the discharge lamp 61 (at this time, the switch element sw3 is off and the switch element sw4 is on), the analog switch A-SW2 is turned on and the analog switch A-SW1 is turned off. Thus, the voltage division value of Vdcp is taken out as output voltage (positive voltage) from the voltage detection terminal t1 for the discharge lamp 61 and the analog switch A-SW3 is turned on and the analog switch A-SW4 is turned off, so that the output voltage inverted and amplified by the operational amplifier OP3 relative to the voltage division value of Vdcn is taken out as positive voltage from the voltage detection terminal t2 for the discharge lamp 62.

Figure 10:
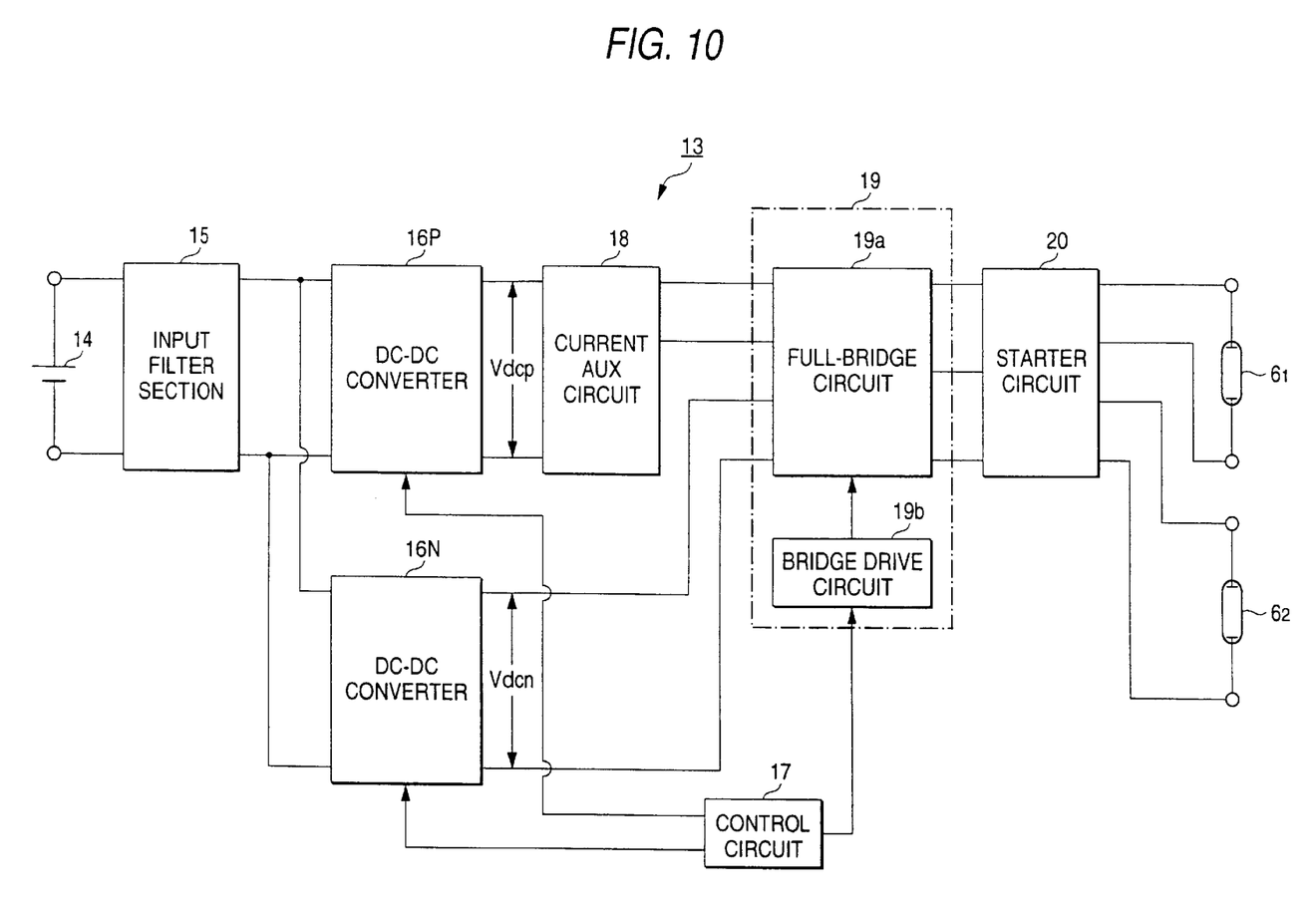
FIG. 10 is a circuit block diagram to show one embodiment of the invention.

FIG. 10 shows an example of the invention; it shows an application example to car's front lights (circuit configuration example to use two discharge lamps).

In a lighting circuit 13, terminal voltage of a battery 14 is supplied through an input filter section 15 to a DC-DC converter 16P for positive-polarity voltage output and a DC-DC converter 16N for negative-polarity voltage output.

A control circuit 17 is provided for the DC-DC converters to control output voltages thereof, and control signals issued by the control circuit 17 are sent to the DC-DC converters. That is, in this case, switch elements connected to two primary windings in a transformer receive the control signals and are turned on/off under the control, whereby the output voltage of each DC-DC converter is controlled.

The control circuit 17 is provided for controlling power supply to the discharge lamps based on detection signals of tube voltage and tube current of each discharge lamp or their equivalent signals, such as detection signals from a detection circuit placed at the stage following the DC-DC converter 16P. For example, a circuit using an operational amplifier, etc., for generating a signal for supplying excessive power exceeding the related power at the initial stage of the discharge lamp according to a control curve in a tube voltage-tube current characteristic chart of the discharge lamp, then gradually decreasing the supplied power and making the transition to constant-power control with the related power can be named. (see JP-A-4-141988.)

The DC-DC converter 16P is followed by a current auxiliary circuit 18 for aiding in reliably making the transition from glow discharge to arc discharge by supplying energy accumulated in a capacitive load provided in the current auxiliary circuit 18 to the discharge lamp when the discharge lamp is started.

A DC-AC converter 19 consists of a full-bridge type circuit 19a (see FIG. 7 for the internal configuration of the circuit 19a) and a bridge drive circuit 19b made up of two half-bridge drivers, and corresponds to the DC-AC conversion circuit 4 in FIG. 7. That is, four semiconductor switch elements are provided in the full-bridge type circuit 19a and are grouped into two pairs and switching control is performed reciprocally, whereby DC input voltage is converted into square wave voltage. For this purpose, the bridge drive circuit 19b generates control signals to the switch elements; it operates upon reception of a signal sent from the control circuit 17.

A starter circuit 20 is provided in common to the two discharge lamps 61 and 62 at the stage following the DC-AC converter 19. The discharge lamps 61 and 62 may be used as light sources of front lights placed on the left and right of the front of a vehicle respectively or may be used as light sources of a high beam and a low beam respectively (in this case, control is required so as not to light the unused discharge lamp in response to beam change).

The configuration of the starter circuit 20 is as shown in FIG. 8 and therefore will not be discussed again in detail. In the embodiment, a spark gap element is used as a switching element. This means that the voltage generated by the discharge current of a capacitor when the element breaks down is applied to the discharge lamp through a secondary winding.

To light only one discharge lamp 61 from the state in which both the discharge lamps 61 and 62 are out, the on/off state of each switch element in the full-bridge type circuit 19a is defined so as to supply positive-polarity voltage to the discharge lamp 61 and supply voltage vdcp to the discharge lamp 61 in the period is raised to the level required for the DC-DC converter 16P, then a start signal is generated for starting the discharge lamp 61. To light only the other discharge lamp 62, the on/off state of each switch element in the full-bridge type circuit 19a is defined so as to supply positive-polarity voltage to the discharge lamp 62 and supply voltage Vdcp to the discharge lamp 62 in the period is raised to the level required for the DC-DC converter 16P, then a start signal is generated for starting the discharge lamp 62. Such a control sequence is adopted, whereby the current auxiliary circuit 18 needs to be provided only at the stage following the DC-DC converter 16P, so that the circuit configuration is simplified.

As seen from the description made above, according to the invention, a pair of switch elements is provided in the DC-AC conversion circuit for one discharge lamp and drive control may be performed so as to alternately operating the switch elements, so that the circuit configuration is simplified, the number of parts and the costs can be reduced, a unit can be miniaturized, and the required space can be saved.

Further, in the lighting circuit for lighting two discharge lamps, the DC power supply circuit is shared and the DC-AC conversion circuit of the full-bridge configuration using the four switches is adopted, whereby the circuit configuration can be simplified (the numbers of the switch elements and their drive circuits are halved as compared with the configuration in the related art).

Furthermore, an inductive load for forming a part of the starter circuit is provided on the connection line of the output terminal of the DC-AC conversion circuit and each discharge lamp, so that placement of the starter circuit need not be changed.

Moreover, the two secondary windings are added with respect to the primary winding of the transformer forming the starter circuit and a start signal is applied from each secondary winding to the corresponding discharge lamp, whereby the starter circuit can be used in common, so that the costs can be reduced and a unit can be miniaturized.

What is claimed is:

1. A discharge lamp lighting circuit comprising:
   a DC power supply circuit for generating a desired DC voltage from a DC input voltage, having two output terminals from which positive-polarity voltage and negative-polarity voltage are respectively output;
   a DC-AC conversion circuit being placed at a stage following said DC power supply circuit for converting the output voltage of said DC power supply circuit into AC voltage and then supplying the AC voltage to a discharge lamp, said DC-AC conversion circuit having a first pair of switch elements for switching the positive output voltage and the negative output voltage sent from said DC power supply; and
   a drive circuit for alternatively driving said first pair of the switch elements.

2. The discharge lamp lighting circuit as claimed in claim 1, wherein said DC power supply circuit has a positive circuit section for outputting positive-polarity voltage and a negative circuit section for outputting negative-polarity voltage.

3. The discharge lamp lighting circuit as claimed in claim 1, wherein said two switch elements connected in series between the output terminals of said DC power supply circuit, the switch elements being controlled to be reciprocally switched.

4. The discharge lamp lighting circuit as claimed in claim 1, wherein one electrode terminal of the discharge lamp is connected to a connection point of the two switch elements through an inductive load and, another electrode terminal is connected to ground.

5. The discharge lamp lighting circuit as claimed in claim 4, wherein said another electrode terminal of the discharge lamp it directly connected to ground.

6. The discharge lamp lighting circuit as claimed in claim 4, wherein said another electrode terminal of the discharge lamp is connected to ground through current detection means.

7. The discharge lamp lighting circuit as claimed in claim 6, wherein said current detection means includes a current detecting resistor for detecting a current flowing the discharge lamp, a non-inverse amplifer to which a current detection signal is input to a non-inverse terminal thereof, and an inverse amplifier to which the current detection signal is input to an inverse terminal thereof, and
   said current detection means selectively outputs an output of said inverse amplifier and an output of said non-inverse amplifier.

8. A discharge lamp lighting circuit comprising:
   a DC power supply circuit for generating a desired DC voltage from a DC input voltage, having two output terminals from which positive-polarity voltage and negative-polarity voltage are respectively output;
   a DC-AC conversion circuit being placed at a stage following said DC power supply circuit for converting the output voltage of said DC power supply circuit into AC voltage and then supplying the AC voltage to a discharge lamp, said DC-AC conversion circuit having a first pair of switch elements for switching the positive output voltage and the negative output voltage sent from said DC power supply;
   a drive circuit for alternatively driving said first pair of the switch elements; and
   a voltage detection means including an inverse amplifier to which the negative polarity output of said DC power supply circuit is input to an inverse terminal thereof, and a non-inverse amplifier to which the positive polarity output of said DC power supply circuit is input to a non-inverse terminal thereof,
   wherein said voltage detection means selectively outputs an output of said inverse amplifier and an output of said non-inverse amplifier.

9. The discharge lamp lighting circuit as claimed in claim 3 wherein said DC-AC conversion circuit further includes a second pair of switch elements which are connected
   in series between the output terminal of said DC power supply circuit, the switch elements being controlled to be reciprocally switched by said drive circuit;
   first discharge lamp is connected to a connection point of the first pair of the switch elements, and second discharge lamp is connected to a connection point of the second pair of the switch elements; and
   while positive-polarity voltage is supplied to the first discharge lamp, negative-polarity voltage is supplied to the second discharge lamp and conversely, and while negative-polarity voltage is supplied to the first discharge lamp, positive polarity voltage is supplied to the second discharge lamp.

10. The discharge lamp lighting circuit as claimed in claim 9, wherein each of the first and second discharge lamps is connected to said DC-AC conversion circuit through an inductive load forming a part of a starter circuit.

11. The discharge lamp lighting circuit as claimed in claim 10 wherein the inductive loads are respectively used as secondary windings of a transformer and a primary winding of the transformer is shared between the discharge lamps, and
   wherein when each discharge lamp is started, start voltage generated on the primary winding of the transformer is increased, then is applied via each secondary winding to the corresponding discharge lamp.

12. The discharge lamp lighting circuit as claimed in claim 9, wherein one of said first and second discharge lamps is used as light source of a high beam and the other is used as light source of a low beam.

13. The discharge lamp lighting circuit as claimed in claim 9, wherein one of said first and second discharge lamps is used as light source of front lights placed on the left side of the front of a vehicle and the other is used as light source of the right side.

* * * * *